United States Patent [19]

Geyer

[11] 4,075,712
[45] Feb. 21, 1978

[54] EXTRUSION AND MIXING APPARATUS

[76] Inventor: Paul Geyer, 15660 Tacoma Ave., Detroit, Wayne County, Mich. 48205

[21] Appl. No.: 753,595

[22] Filed: Dec. 22, 1976

Related U.S. Application Data

[63] Continuation-in-part of Ser. No. 712,450, Aug. 8, 1976, abandoned, which is a continuation of Ser. No. 565,453, April 7, 1975, abandoned.

[51] Int. Cl.² .............................................. B29B 1/06
[52] U.S. Cl. ...................................... 366/79; 366/80; 366/323
[58] Field of Search ................... 259/191, 192, 193, 9, 259/10, 25, 26, 45, 46, 97; 425/205, 208, 209; 264/99, 68, 69

[56] References Cited

U.S. PATENT DOCUMENTS

| 2,595,455 | 5/1952 | Heston | 259/191 |
| 3,102,694 | 9/1963 | Frenkel | 259/9 |
| 3,164,375 | 1/1965 | Frenkel | 259/9 |
| 3,632,255 | 1/1972 | Geyer | 425/205 |

*Primary Examiner*—Robert W. Jenkins
*Attorney, Agent, or Firm*—Cullen, Settle, Sloman & Cantor

[57] ABSTRACT

An apparatus is provided for the mixing and extruding of thermo-plastic and thermo-setting materials in which a rotor member is rotatable within a barrel member. The members are provided with interacting rotor and barrel helical grooves in the mixing stage of the apparatus which includes a rotor to barrel stock transfer zone and a barrel to rotor stock transfer zone. The grooves of the rotor and barrel members, in the rotor to barrel zone, being sized, with the extrusion capacity of the helical groove in the rotor member decreasing and with the helical groove in the barrel member providing the extrusion capacity for the material. With such a construction relative rotational movement between the barrel and rotor members forces material or stock from the groove in the rotor member into the groove of the barrel member at an approximate uniform rate along the length of the rotor to barrel zone. Material or stock not transferred and remaining in the groove of the rotor member is conveyed forwardly as a result of the aforesaid relative rotational movement between the barrel and rotor members.

The apparatus includes material or stock reorienting means in the portion of the barrel member, in the barrel to rotor zone, which interrupts the material flow along the barrel groove in the barrel to rotor zone and is effective to turn the material presented as near to right angles as possible away from the groove and to direct the reoriented material towards the groove provided in the rotor member, where the reoriented material, is mixed with any axially advancing material in the rotor member. The material then flows to the discharge end of the apparatus upon continued relative rotational movement between the barrel and rotor members.

The apparatus may be provided with means for longitudinally displacing one of the barrel or rotor members relative to the other to vary the extrusion or through flow capacity of the members. The material reorienting means and the means providing for longitudinal displacement between the barrel and rotor members may be combined in one apparatus.

32 Claims, 49 Drawing Figures

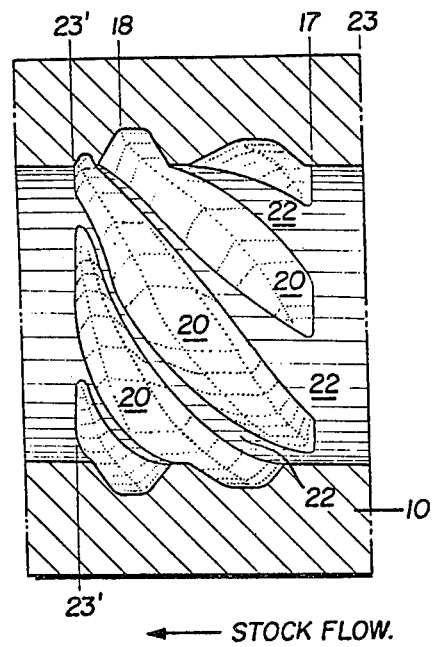
FIG. 9
← STOCK FLOW.
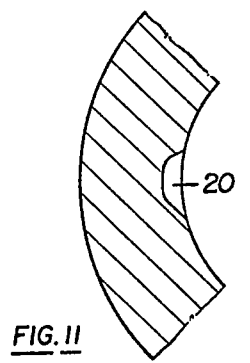
FIG. 11
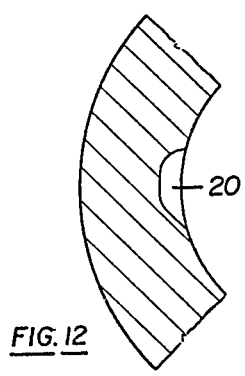
FIG. 12
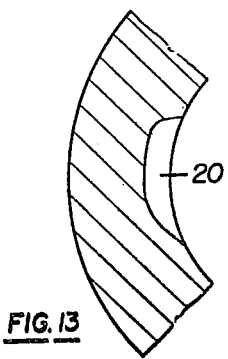
FIG. 13
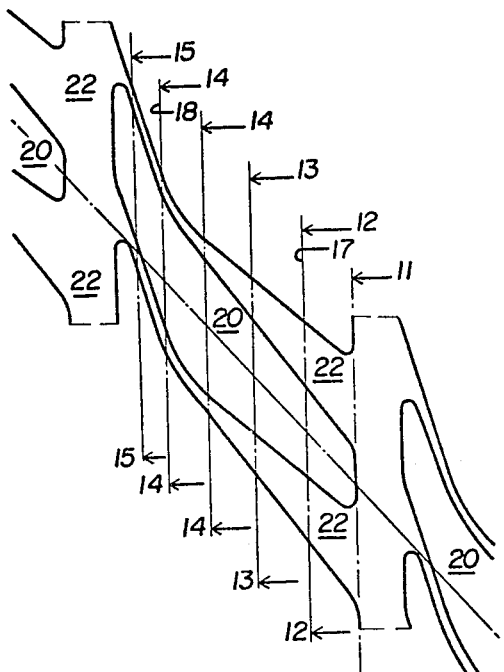
FIG. 10
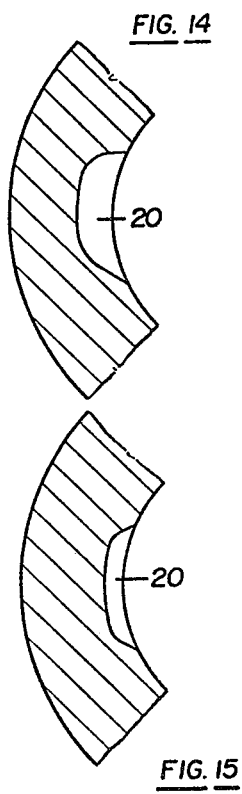
FIG. 14
FIG. 15

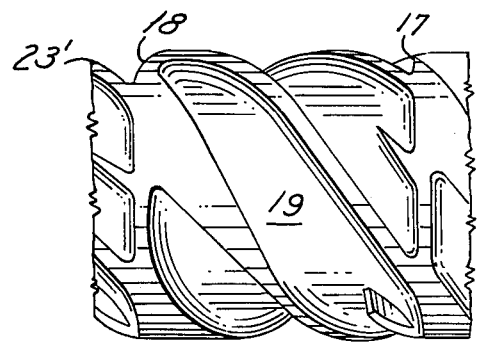
FIG. 25
FIG. 27
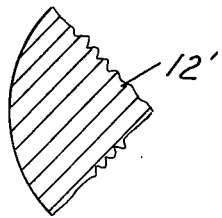
FIG. 28
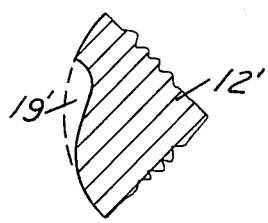
FIG. 29
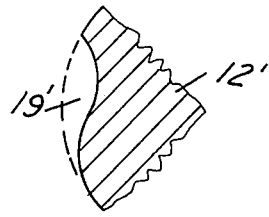
FIG. 30
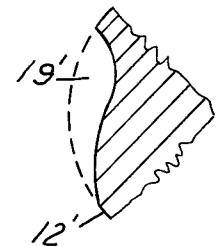
FIG. 33
FIG. 31
FIG. 32
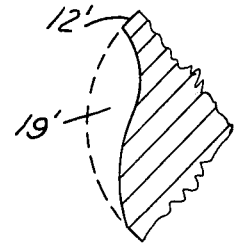
FIG. 26
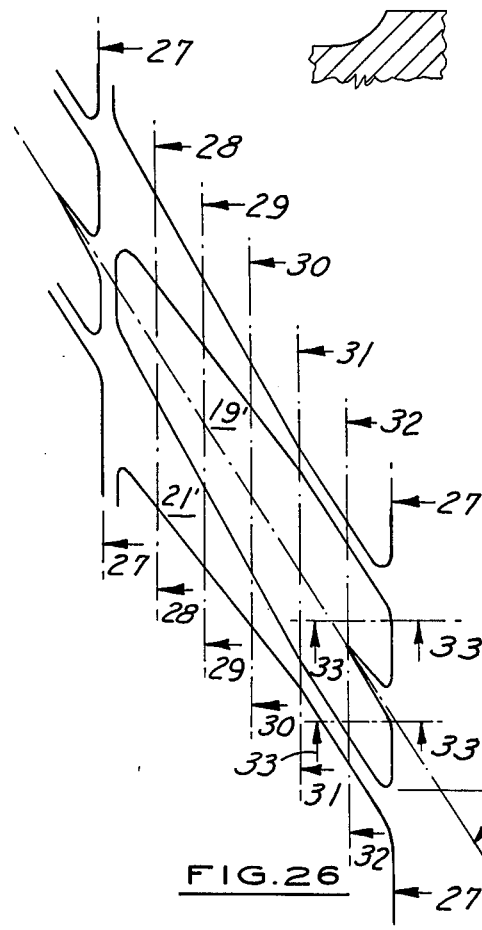

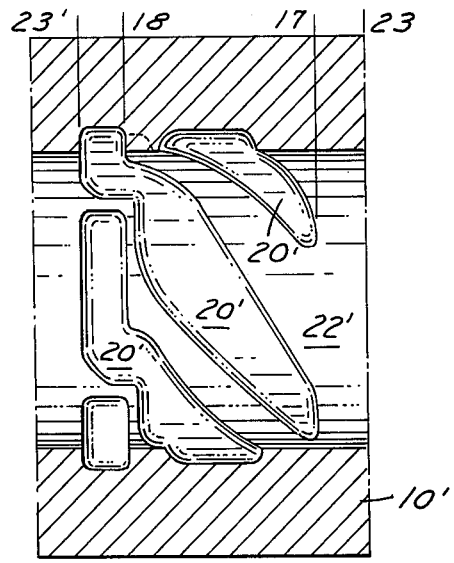
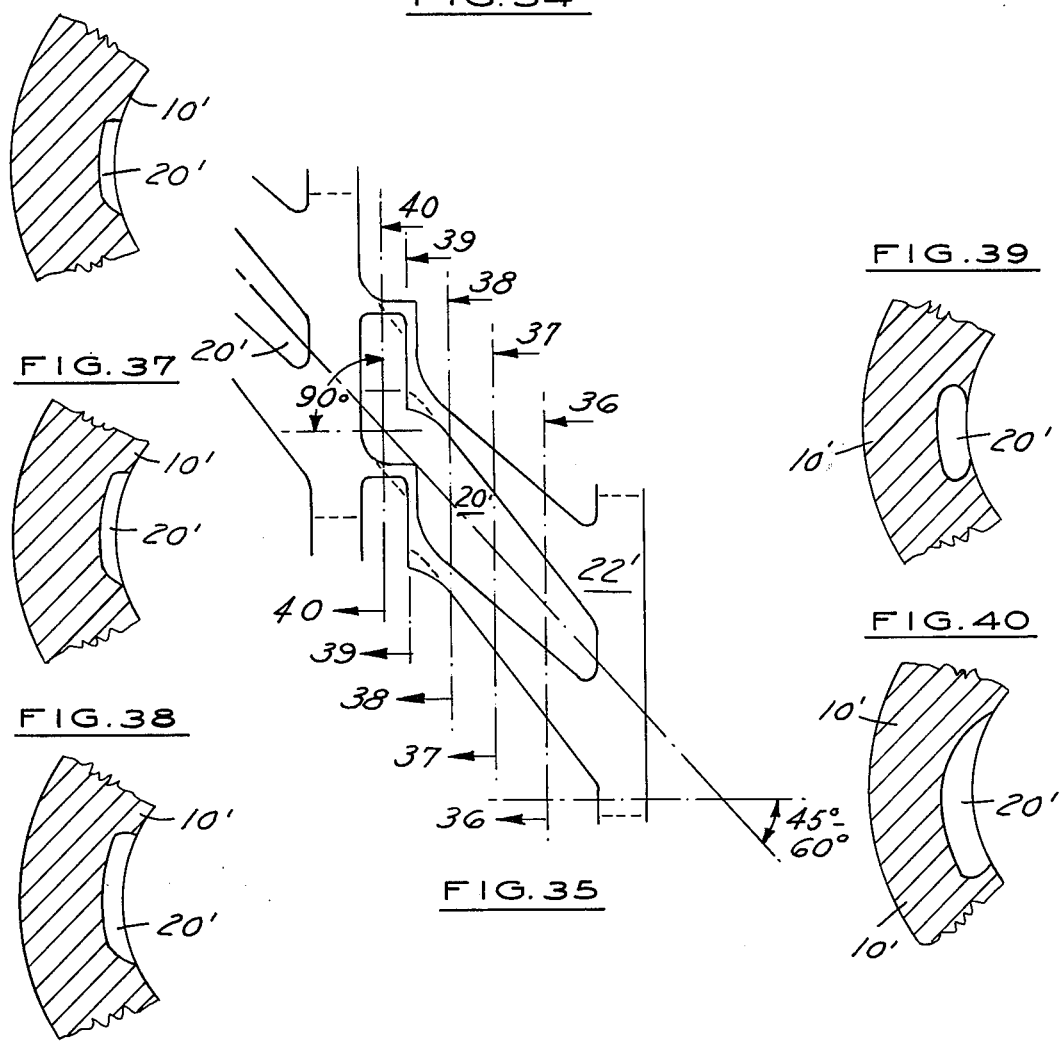

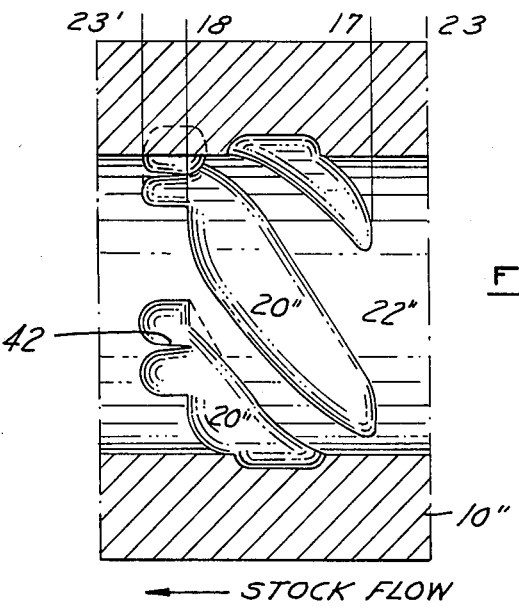
FIG. 41
← STOCK FLOW
FIG. 43
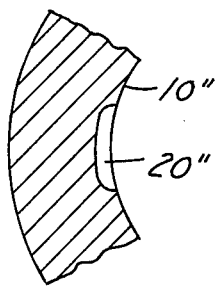
FIG. 44
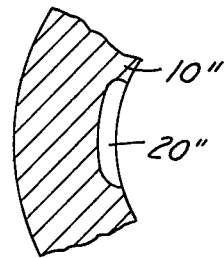
FIG. 45
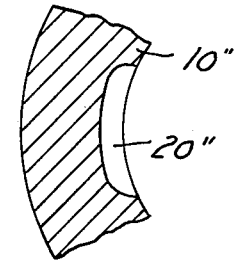
FIG. 48
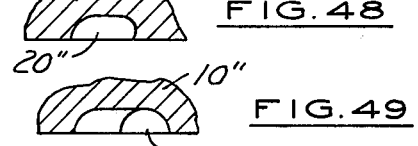
FIG. 49
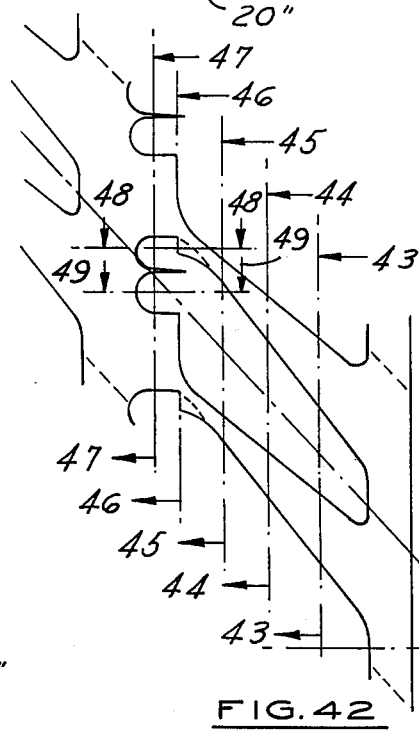
FIG. 42
FIG. 46
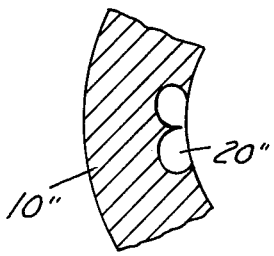
FIG. 47
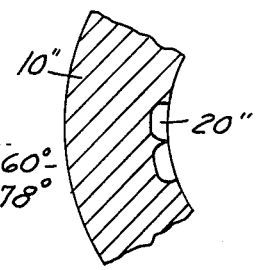

EXTRUSION AND MIXING APPARATUS

RELATED APPLICATIONS

This application is a continuation in part of application Ser. No. 712,450, filed Aug. 8, 1976 entitled *Extrusion and Mixing Apparatus*, now abandoned, which is a continuation of application Ser. No. 565,453, filed Apr. 7, 1975 entitled *Extrusion and Mixing Apparatus*, now abandoned.

BACKGROUND OF THE INVENTION

1. Field of the Invention

This invention relates to the mixing and extrusion of thermo-plastic and thermo-setting materials. More particularly, this invention concerns screw or worm type apparatus for the mixing and extrusion of varied viscosity, natural and synthetic rubber and elastomeric material. Unless otherwise indicated, the term "extruder" as used herein, refers to and includes screw or worm type apparatus used to obtain an extrudate of desired cross-sectional configuration and/or for the mixing, blending, milling of thermo-plastic or thermo-setting compounds.

2. Description of the Prior Art

Conventional extruders include a barrel, a screw type rotor mounted within the barrel and adapted for rotational movement relative to the barrel and a means of introducing the material to be processed into the extruder, such as a hopper and its associated apparatus, if any. The rotor is provided with various threaded configurations, and rotational movement of the rotor relative to the barrel forces the material being processed through the barrel and out of the downstream end of the extruder. While the processed material is being discharged from one end of the extruder, hot or cold unprocessed material is fed into the feed hopper at the opposite end of the extruder to thereby make the extrusion process continuous.

Examples of the prior art are shown in my U.S. Pat. No. 3,632,255, dated Jan. 4, 1972 and my U.S. Pat. No. 3,375,549 dated Apr. 2, 1968. Another prior art patent of general interest is the Parshall and Geyer U.S. Pat. No. Re. 26,147 dated Jan. 24, 1967.

Although many problems relative to the extrusion of plastic materials have been solved, dispersion, blending and temperature control are continuing problems, by which the quality of extrusion is measured.

SUMMARY OF THE INVENTION

1. Mixing and Dispersion

In mill mixing, where the stock is banded on one roll and rotated through the mill bank and nip, a sample of the band will show that the stock adjacent to the mill roll has not been sheared or moved. This is an example of unequally sheared or poorly mixed stock. A mill man to achieve, "best mill mixing" will cut the mill band, roll the stock into a long roll or "pig", which he then feeds into the mill nip. What happens is an elongation of the stock particles as they are drawn through the mill nip. Rolling and feeding at an angle, the particles, which are now short lines, are elongated into areas. Thus, dispersion of particles is obtained with minimum stock shearing and minimum power usage.

The design of an extruder limits the stock flow to a fixed labyrinth formed by the rotor groove and barrel groove configurations. This invention provides a combination of interacting rotor and barrel grooves that shear and elongate the stock particles in a similar manner as that of "best mill mixing". Extruder mixing is improved directly as the member of grooves or leads, but for the purpose of clarity the following discussion will deal with a single lead design.

The stock from the hopper enters the mixing stage of the apparatus via the rotor groove. The mixing stage is comprised of two zones, first a rotor to barrel stock transfer zone, then a shorter barrel to rotor stock transfer zone. The barrel to rotor zone may be one half to one twentieth as long as the rotor to barrel zone. It is preferably about on forth as long. In the rotor to barrel zone stock is transferred from a rotor groove to a barrel groove and in the barrel to rotor zone stock is transferred from a barrel groove to a rotor groove.

In the rotor to barrel zone, the rotor is fitted with a rotor groove which is proportioned with decreasing extrusion capacity, so that, all or substantially all or part of the stock, as an example, three quarters of the stock is caused to flow outward uniformly along the length of the zone. This stock is received by a spiral barrel groove or "mixing pocket". Extrusion capacity of a rotor groove is related to the groove dimensions, where the rotor groove is reacted by a smooth barrel. However, where the reacting surface is discontinuous, as in a grooved barrel, groove dimensions do not necessarily correlate with extrusion capacity. Extrusion capacity therefore is the volume of stock caused to flow through the extruder by combined action of the rotor and barrel grooves.

Stock in the rotor groove, receives shearing and elongation of the stock particles as it is conveyed along the rotor groove by extruder action. As stock is transferred to the barrel it is sheared from the rotor groove, elongating stock particles, as the first step in obtaining dispersion. The sheared stock is accumulated in the barrel mixing pocket or groove in the form of a spiral wound cone, with the large part of the cone downstream.

While the transfer of less than all or substantially all of the stock of the barrel may represent less mixing action than that received by the transfer of all of the stock or material, the ratio of rotor to barrel and barrel to rotor stock can be tailored to suit stock mixing and blending requirements.

The barrel to rotor zone is relatively short and is designed to combine the barrel and rotor stock flows into the rotor groove. To obtain "best mill mixing" the stock flow from the barrel groove is turned by the abrupt transfer design of the downstream end of the barrel groove so that stock elongation flow lines enter the "shear area", that is the circumference of rotor or barrel bore at an acute angle, that is, the stock is reoriented as it is presented to the shearing action of the rotor.

One form of barrel groove discharge end recognizes that the stock flow tends to be faster at the outer portion of a barrel groove. Therefore, a baffle is provided so that pressure flow at the inner portion of the groove causes the stock to turn and flow out of the groove. This flow is assisted by diminishing the groove depth. The barrel groove end may also be fitted with a stock flow divider, which divides the cone of stock into two columns, tending to stabilize the orientation of the stock and provide additional barrel reaction to the rotor for developing extrusion capacity.

The change of lead can be positive or negative. The two maximum conditions being, first circumferencial or zero lead, and second axial or infinite lead, if a negative is undesirable for stock clean-out reasons. It is recognized that the orientation of stock in an extruder groove tends to be circumferencial at the surface and across the groove sub-surface. Therefore it is the object of the groove design to obtain maximum stock orientation. A device to accomplish this is a plow at the trailing edge of the groove, which turns under the circumferential flowing stock, forcing it to flow axially into the barrel to rotor zone.

Change in groove depth can be circumferential, axial, or along the groove, again its the object of the design, to obtain right angle orientation of the stock flow lines.

The aforesaid stock flow patterns are ideal and not fully obtainable, but even partial orientation is a significant improvement. Also, it must be recognized that a combination of designs is possible to obtain the desired orientation. Where less than substantially all of the stock is transferred to the barrel groove in the rotor to barrel zone the stock not transferred, for example, the aforementioned one quarter of the stock not transferred to the barrel groove, is conveyed by the rotor from the rotor to barrel zone directly into the barrel to rotor zone of the rotor. The rotor being continuous, but enlarged in cross-section permits the rotor groove to be offset so that the rotor stock enters the enlarged portion of the rotor groove only after some stock or material from the barrel groove has transferred to the rotor. The object of this design is to place the rotor stock in preferred position to be transferred upon reaching a second mixing stage.

Also, as the aforementioned one quarter of the stock in the rotor groove nears the end of the rotor to barrel zone, the rotor groove can be fitted with dividers, so that numerous columns of stock enter the enlarged portion of rotor at the barrel to rotor zone.

The barrel to rotor zone is followed by simple extruder zone, that is a spiral groove rotating relative to a smooth cylindrical barrel. This section acts as a bearing area to guide the rotor and develops pressure for extrusion flow.

The preferred design of the mixing stage, i.e., rotor to barrel zone, is such that the extrusion capacity of rotor and barrel grooves is such that the rotor to barrel zone develops stock flow pressure when operated at its designated capacity.

The frugal use of power permits multi-groove and multistage designs. The preferred design uses a rotor to barrel zone with four start similar screw grooves communicating with four to six start barrel grooves or mixing pockets. The said four and six start grooves although similar can have different extrusion rates to effect extrusion blending. For the ultimate in mixing three mixing stages in series can be used to process thermo-setting stocks at a safe temperature.

2. Extrusion Blending

The basic form of extruders is essentially a long activated channel, so that sequence of entering material is the same as that of leaving. Some blending is obtained as the stock is formed into a long spiral, the center of which tends to lag the extremes. High die pressures accent this lagging called pressure flow. Actually, it is back pressure flow. This means that blending has been achieved by back pressure flow only, a wasteful expenditure of power.

The present invention provides means for obtaining a designed amount of blending. A mixing stage with both rotor and barrel grooves has two rates of extrusion. The stock transmitted by the rotor arrives at the receiving barrel to rotor zone ahead of that transmitted by the barrel groove. This displacement takes place with no expenditure of power as such. The degree of blending can be designed. By altering the relative capacities of the rotor and barrel extrusions, a wide range of blending is possible. This range of blending makes continuous mixing possible with less accurate continuous weighing equipment.

3. Temperature Control

The temperature rise in an extruder results from the work required to shear the stock. As the extruder rotor design is fixed each turn of the rotor produces the same shearing action on the stock and requires the same work input. Thus, the work input is proportional to the rotor speed. Heat transfer from the extruder tends to be a constant, determined by stock temperature and cooling system constants. The result is that stock discharge temperatures rise with rotor speed. Therefore, when stock temperatures are critical the rotor speed is limited. As stocks of various viscosities (and heat generating abilities) are processed by a mixing line including an internal mixer, the extruder has to be sized to process the mixing capacity of the internal mixer, when the mixer is processing the most viscous stock. This results in either a large, low revolution per minute extruder mixer, or one with minimal mixing ability. The large, low revolution per minute mixer extruder results in high capital expenditure in hardware and torque, which cannot be effectively used on the low viscosity stocks.

The minimal mixing ability extruder at higher revolution per minute can economically process the high viscosity stocks, but is even more ineffective in processing the low viscosity stocks. An ideal extrusion mixer for use with an internal mixer would be a small, high revolution per minute mixer that imparts its full power capability to the mix regardless of stock viscosity and at capacity determined by the internal mixer. An extrusion mixer, used independently of an internal mixer on remills of final mix or curative incorporation, temperature of discharge can be even more important. In cases where curatives are added, discharge temperature must be high enough to melt sulphur and low enough not to initiate cure. This temperature spread can be as low as twenty degrees F. Again, with stocks of varying viscosity rotor speed alone is not a satisfactory means of temperature control.

As extrusion equipment has to be competitive with other milling equipment, lack of temperature control has reduced the number of installations where extrusion mixing can be used.

In view of the foregoing, it can be seen that temperature control is of the utmost importance, if a variety of stocks are to be processed. An extruder mixer compares to an internal mixer with a fixed cycle time.

The present invention provides, in essence, a variable cycle time for an extruder mixer. It is accomplished by means of throughput or capacity per turn control. As the capacity per turn is reduced and the same work per turn supplied to the rotor, more work per pound is expended on the stock. The capacity per turn control is accomplished mainly by altering the extrusion capacity of the barrel to rotor zone. This previously described zone is of short length, as measured on the rotor axis, and is designed to transfer stock, from the barrel groove to the full area rotor groove of this zone. The extrusion capacity of this zone can be reduced by moving the rotor forward so that the barrel groove discharge is aligned with a smaller area rotor groove at the downstream end of the rotor to barrel zone. This restriction reduces extrusion capacity, so that the work per pound is increased and, thereby, the extrusion temperature. This method does not waste power because, with lower throughput, sheared stock sections become thinner, thereby increasing the shearing or mixing per stock unit. The rotor position can be set at any point between minimum and maximum restriction. This allows a setting to be found, to satisfy capacity and discharge temperature for a wide range of stock viscosities. The minimum restriction setting establishes the required milling for the hardest or most viscous stock. Rotor design is established to process the hard stock at the desired capacity, discharge temperature, rotor speed near full power of the drive motor.

Softer or less viscous stocks require less torque to drive the rotor. Power input is now restored by restricting the extrusion capacity and increasing rotor speed to compensate for lower torque. Thus, near full power can also be usefully used to mix the softer stocks.

The unit now approaches the ideal extrusion mixer as it can impart full power mixing to hard and soft stocks alike and hold desired capacity and discharge temperature.

It is therefore an object of the present invention to provide an extrusion mixer which will disperse particles of a mix with minimum shearing motion and, therefore, least degradation to the stock polymer.

Another object of the present invention is to provide an extrusion mixer that will blend stock as it traverses the rotor and barrel of the apparatus.

Still another object of the present invention is to provide an extrusion mixer which can be adjusted to control temperature of the extrudate at discharge, by means of altered extrusion characteristics of rotor and barrel configurations.

A further object of the present invention is to provide an extrusion mixer which can be set to perform varied amounts of mastication on the stock as it traverses the apparatus.

A still further object of the present invention is to provide an extrusion mixer which can be operated at a range of rotor speeds and discharge extrudate at the same set temperature.

Another object of the present invention is to provide an extrusion mixer which can be operated at higher rotor speeds so as to minimize capital expenditures.

Still another object of the present invention is to provide an extrusion mixer capable of combining cold fed ingredients into a homogeneous mix and at the desired extrusion temperature.

A further object of the present invention is to provide an extrusion mixer for the mixing and extrusion of natural and synthetic rubbers and other plastic materials, when materials are either hot or cold as fed into the apparatus.

A still further object of the present invention is to provide an extrusion mixer that when operated in conjunction with an internal mixer can be set to contribute most of its power to the mix regardless of stock viscosity.

BRIEF DESCRIPTION OF THE DRAWINGS

FIG. 9 is a sectional view of the mixing pocket or groove of the barrel member, using change of lead for stock reorientation;

FIG. 10 is a surface development of a typical mixing pocket or groove of the barrel member, using change of lead for stock reorientation;

FIGS. 11 through 15 inclusive are sectional views of the barrel mixing pocket or groove, taken progressively along the pocket or groove as shown in FIG. 10;

FIG. 25 is a fragmentary elevational view of the grooves of a rotor member of modified design in a typical mixing state;

FIG. 26 is a surface development of a typical groove of the rotor member shown in FIG. 25, showing lead and width;

FIGS. 27 through 33 inclusive are sectional views of a typical rotor groove, taken progressively along the groove of the rotor member as shown in FIG. 26;

FIG. 34 is a sectional view of the mixing pocket or groove of a barrel member of modified design, using change of lead for stock reorientation;

FIG. 35 is a surface development of a typical mixing pocket or groove of the barrel member shown in FIG. 34, using change of lead for stock reorientation;

FIGS. 36 through 40 inclusive are sectional views of the barrel mixing pocket or groove, taken progressively along the pocket or groove as shown in FIG. 35;

FIG. 41 is a sectional view of the barrel mixing pockets or grooves of a barrel member of modified design, using change of lead for stock reorientation;

FIG. 42 is a surface development of a typical mixing pocket or groove of the barrel member shown in FIG. 41; and FIGS. 42 through 49 inclusive are sectional views of barrel mixing pockets or grooves, taken progressively along the pocket or groove as shown in FIG. 42.

DESCRIPTION OF PREFERRED EMBODIMENTS

Figure 1:
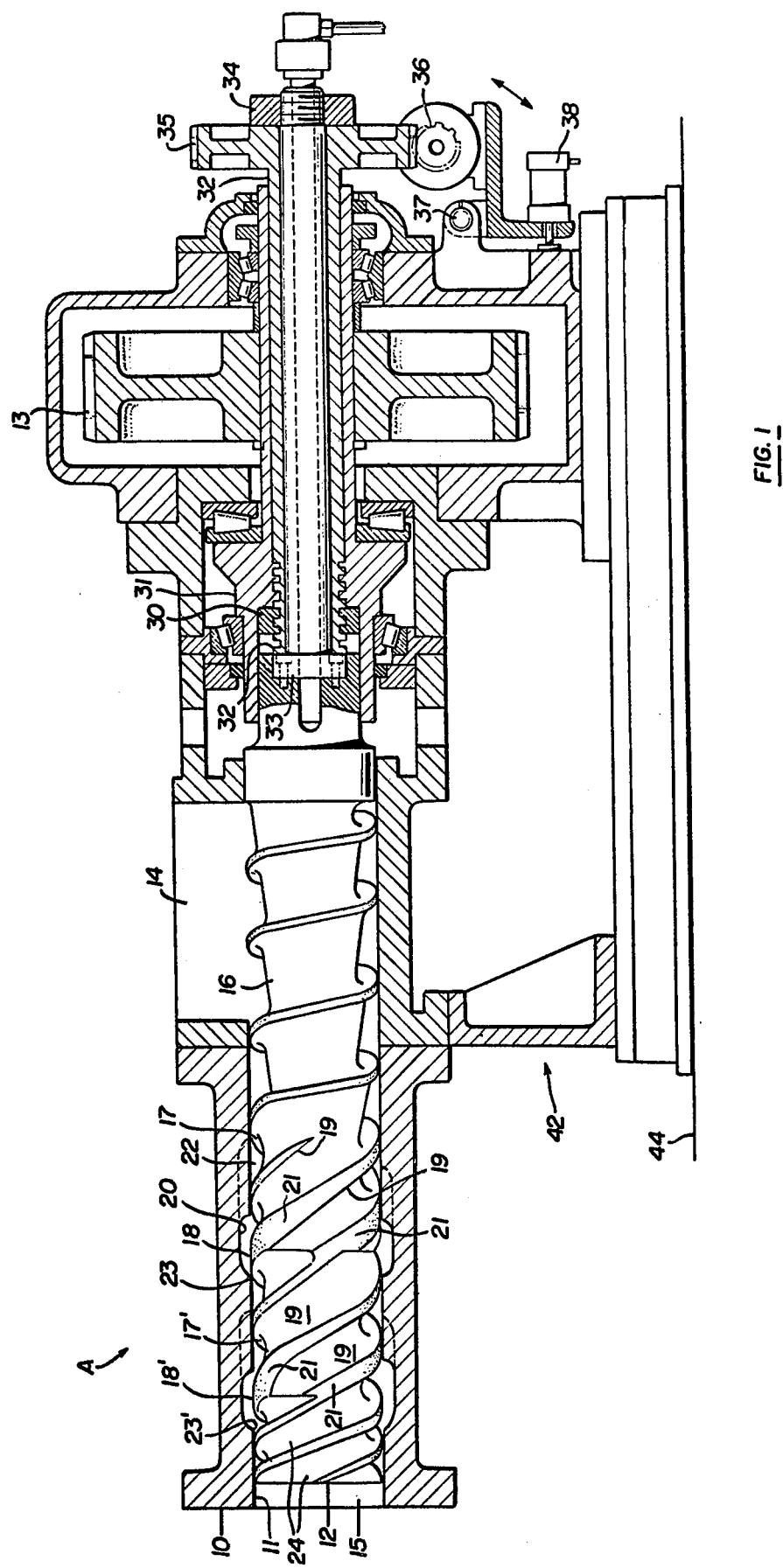
FIG. 1 is a sectional view of an apparatus constructed in accordance with the present invention and represents the preferred embodiment of the present invention as applied to process rubber like compounds, discharged from an internal mixer.

Referring to the drawings, FIG. 1 is a sectional elevation view of the extrusion apparatus A in accordance with the invention and is the preferred embodiment of the invention as applied to a natural and synthetic rubber stock and materials and particularly as fed thereto hot from an internal batch mixer. The extrusion apparatus A has a barrel or barrel member 10, provided with a uniform diameter bore 11, extending therethrough which acts in combination with rotor, screw or screw member 12, rotatably mounted therein. The rotor member 12 is adapted to be rotated by a variable speed drive means 13 as is conventional in the art.

The barrel member 10 is provided at the feed end thereof with a hopper opening 14 in the top thereof, or on the side thereof, and remote from the discharge end 15 of the barrel member 10 through which stock to be processed is introduced into the apparatus A.

The rotor member 12 is provided with a single start helical groove 16 which when filled with stock from hopper opening 14 and rotated relative to barrel 10 by the variable speed drive means 13, causes the stock or material to be moved forward along the rotor groove 16 to point 17. The rotor member 12 from point 17 to point 18 is provided with four start helical grooves 19 which connect with single start helical groove 16 and also cause the stock or material to be moved forward. The grooves 19 of the rotor member 12 which may have a helix angle of about 45° to 78° with the centerline of the rotor are similar and are spaced equally around the rotor member 12. These grooves 19, diminish uniformly in extrusion capacity from point 17 to point 18 or from full extrusion capacity, as an example, to one quarter extrusion capacity, as energized by relative rotation of the grooves 20 and land areas 22 of the surrounding barrel member 10 as shown in FIG. 1.

It should be noted that extrusion capacity as referred to previously in the Summary of the Invention is not directly related to depth, area or volume of the grooves, but is the amount of stock caused to flow in the barrel grooves 20 by the relative rotating action of the barrel grooves 20 and land areas 22. Groove ratio of depth to width, slope of groove sides or bottom, location in barrel or rotor, easement of sharp groove corners are also significant and included in the term extrusion capacity.

The effect of this diminishing extrusion capacity is to transfer, as an example, three quarters of the stock flow of the rotor grooves 19 to the barrel grooves 20 at the rotor to barrel zone of each mixing stage as discussed previously in the Summary. Because of the groove design this stock approaches a uniform thin slab equal in width to the distance of point 17 to point 18. Each barrel groove 20 will receive stock or material from each rotor groove 19 in succession thereby effecting considerable blending.

There are six barrel grooves 20 shown in the preferred embodiment of FIGS. 1 and 9. In the length from point 17 to point 18, the grooves 20 communicate with the rotor grooves 19 and the helix of grooves 20 which preferably are from about 45° to 60° with the centerline of the bore 11 is such to cause stock flow from point 17 to point 18 at the rotor to barrel zone. The relative extrusion capacity of barrel grooves 20, relative to the extrusion capacity of rotor grooves 19, of the exemplary apparatus is such that a difference of stock flow rate exists between the stock in barrel grooves 20 and that of the rotor grooves 19. The object of this is to allow some stock to pass through the mixing zone at an accelerated rate thereby creating a stock blending condition.

At point 18, the barrel grooves 20 now transporting, as an example, three quarters of the extruder throughput are designed to reorient that stock at the barrel to rotor zone discussed previously in the Summary. Orientation of stock is the direction of strain caused by shearing stress imposed by the apparatus A. The method of reorienting, shown in the preferred embodiment (FIGS. 9-15 incl.) is to reduce or diminish the depth of the barrel grooves 20 and employ in the barrel to rotor zone a change in the helix angles of the barrel grooves 20. That is barrel grooves 20 between points 17 and 18 of the rotor to barrel zone are at a maximum lead, say they advance a circumference distance per turn or have a helix angle of 45° with the center line of the rotor. At point 18 through 23 of the barrel to rotor zone which in the depicted apparatus is about one fourth as long as the rotor to barrel zone, a minimum lead is provided. That is barrel grooves 20, between points 18 and 23 of the barrel to rotor zone are circumferential or as near circumferential as possible without over restricting stock flow. Also between points 18 and 23 of the barrel to rotor zone the cross-sectional area of the barrel grooves 20 is reduced from maximum to zero, thus assisting in inducing stock flow from barrel grooves 20 back to rotor grooves 19 of the rotor member 12 in the barrel to rotor zone of the apparatus A.

The rotor grooves 19 at point 18 are enlarged from one quarter extrusion capacity to full extrusion capacity, providing an adequate channel for the reoriented stock flow which is being sheared from barrel grooves 20 in the barrel to rotor zone. Also at point 18, as an example, the one quarter of the stock not transferred to barrel grooves 20 in the rotor to barrel zone as described previously in the Summary is received by the enlarged rotor groove 19 to be mixed with the reoriented barrel stock in the barrel to rotor zone. The discharge of groove 19 (one quarter extrusion capacity groove) at point 18 can be provided with numerous groove dividers to promote flow control and facilitate mixing. It is shown in FIG. 1 as aligning with the center line of enlarged extrusion capacity groove 19 in FIG. 1 but can be offset, so that the rotor stock or material is placed in a preferred position to be transferred at the next mixing stage.

The bore 11 of barrel member 10 between points 23 and 17' (next mixing stage), is smooth and without any groove configurations to act as a bearing guide for the rotor 12. The rotor grooves 19 are maintained at full extrusion capacity from point 18 forward to point 17' of the next mixing stage.

FIG. 1 shows an apparatus with two mixing stages as per above description although additional mixing stages may be provided or a single stage may be used. The two mixing stages are followed by four start helical motor grooves 24 which are continuous with grooves 19, but have a reduced extrusion capacity. The rotor grooves 24 contained in a smooth bore 11 of barrel 10, combine to act as a bearing for rotor 11. Also, it should be noted that the decreased lead and, therefore, reduced extrusion capacity is such that at full capacity operation, the stock flow is restrained generating pressure in the apparatus A. This pressure keeps the mixing stages full of stock and assures intensive shearing action.

Figure 2:
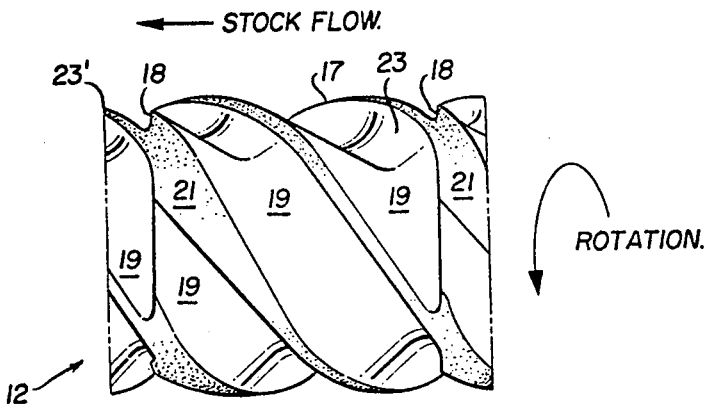
FIG. 2 is a fragmentary elevational view of the grooves of the rotor member in a typical mixing stage.
Figure 4:
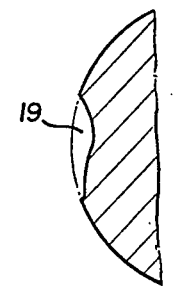
FIGS. 4 through 8 inclusive are sectional views of a typical rotor groove, taken progressively along the groove of the rotor member as shown in FIG. 3.
Figure 5:
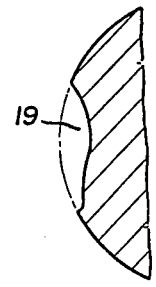
Figure 6:
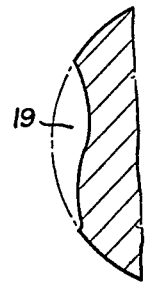
Figure 3:
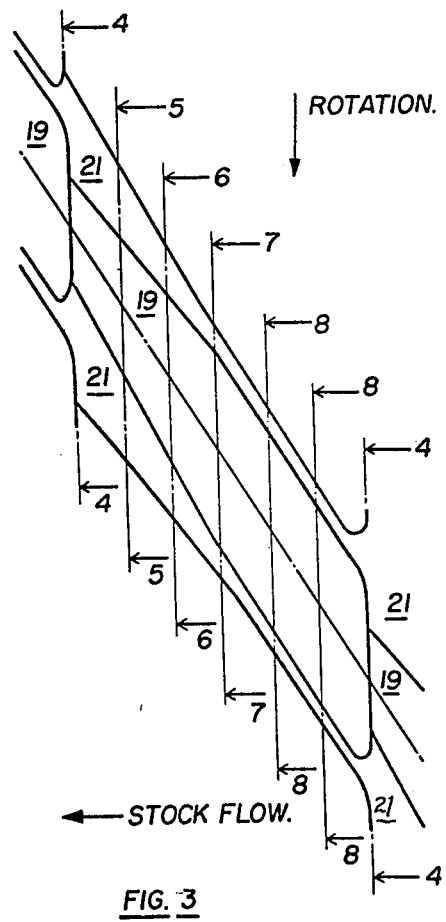
FIG. 3 is a surface development of a typical groove of the rotor member, showing lead and width.
Figure 7:
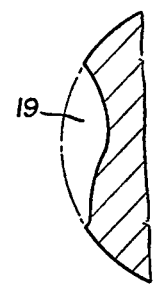
Figure 8:
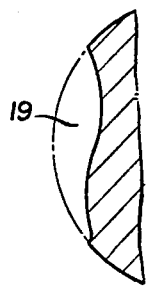

FIG. 2 is an enlarged view of the quadruple start rotor grooves 19 of the rotor member 12 for a complete mixing stage from point 23 of the first stage, to point 23' of the second stage. FIG. 3 is a surface development of one quadrant of the helical groove 19 of the rotor 12 showing the relation of the groove 19 and land areas 21 of rotor member 12.

FIGS. 4–8 inclusive illustrate progressive transverse sections of quadrant of the rotor member 12 showing approximate shape of the groove 19 to achieve extrusion capacity. FIG. 9 is a sectional view of the preferred barrel member 10 showing six start helical barrel grooves 20 and land areas 22 from point 23 of the first mixing stage to point 23' of the second mixing stage.

FIG. 10 is a surface development of one helical sextant of the bore 11 of barrel member 10 showing the relation of groove 20 to land areas 22. More important, FIG. 10 displays the change of lead between points 17 and 18, compared with lead between points 18 and 23'.

FIGS. 11–15 inclusive illustrate progressive transverse sections of sextant of the barrel member showing approximate shape of barrel grooves 20 for stock retention and transmission.

Figure 16:
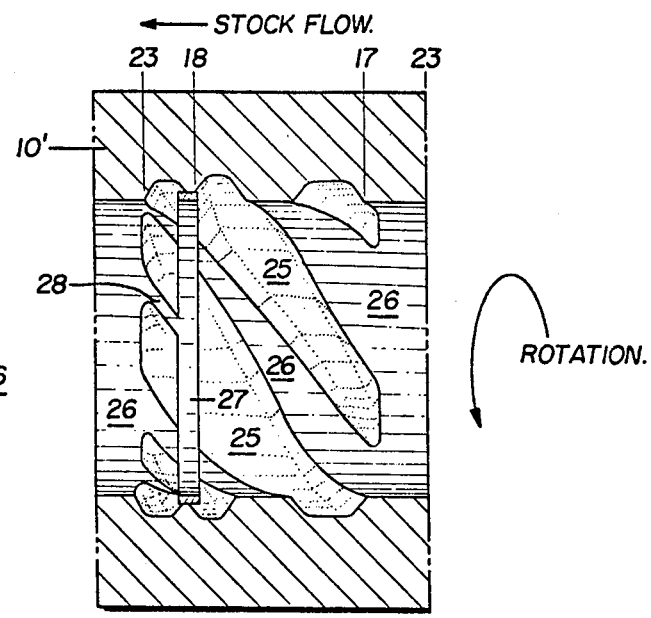
FIG. 16 is a sectional view of the barrel mixing pockets or grooves, using a ring type baffle for stock reorientation and representing a modification of the present invention.
Figure 18:
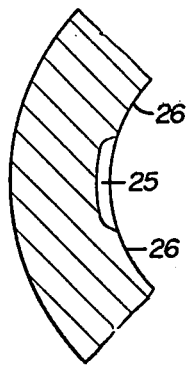
FIGS. 18 through 22 inclusive are sectional views of barrel mixing pockets or grooves, taken progressively along the pocket or groove as shown in FIG. 17.
Figure 19:
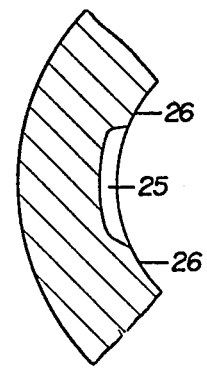
Figure 20:
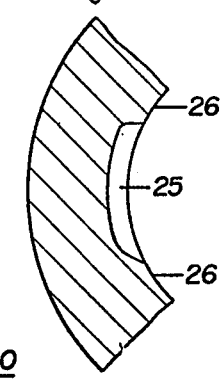
Figure 17:
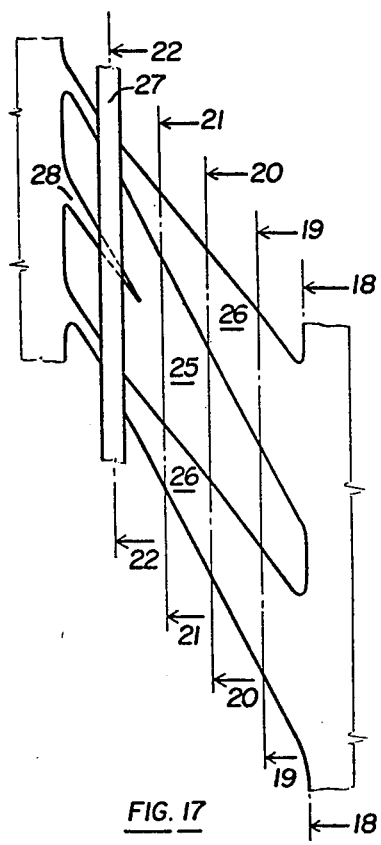
FIG. 17 is a surface development of a typical mixing pocket or groove using ring type baffle for stock reorientation as shown in FIG. 16.
Figure 21:
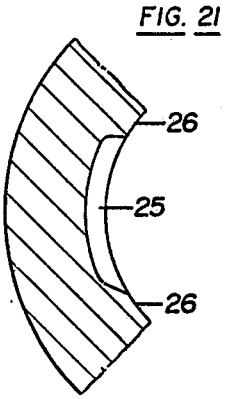
Figure 22:
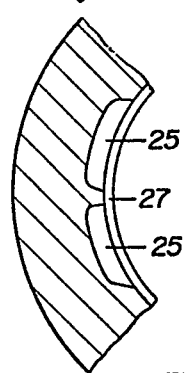

FIG. 16 is a sectional view of another or alternate form of barrel groove 25 of barrel member 10. There are four start helical grooves 25 with land areas 26 in this alternate barrel member 10'. Grooves 25 accumulate the three quarters of the stock flow expelled from rotor between points 17 and 18 of the rotor to barrel zone, in a similar manner to grooves 20. The main difference between this and the preferred embodiment of FIGS. 9–15 is that the accumulated groove stock is induced radially outward from the groove 25 by means of a ring baffle 27. Baffle 27 retards the stock flow at the outer portion of the groove 25 allowing the lower portion and now faster portion, to turn the stock or material in a radial direction. The alternate structure does not employ a change of lead, but conceivably could be combined with the preferred embodiment of FIGS. 9–15 inclusive by having more or less lead. The grooves 25, as shown in FIGS. 16 and 17, are provided with a stock divider 28 at the center line of the groove 25 and between points 18 and 23' of the barrel to rotor zone. This divider 28 assists in activating rotor extrusion capacity and also establishes additional cleavage for an increase in stock shear. The grooves 25 in the barrel to rotor zone shown in FIG. 16, each has a lead as a continuation of the groove in the screw to barrel zone. Such groove has a positive lead.

It should be appreciated however that the grooves 25 in the barrel to rotor zone may have a "negative lead", or points in between a positive lead and negative lead.

Figure 23:
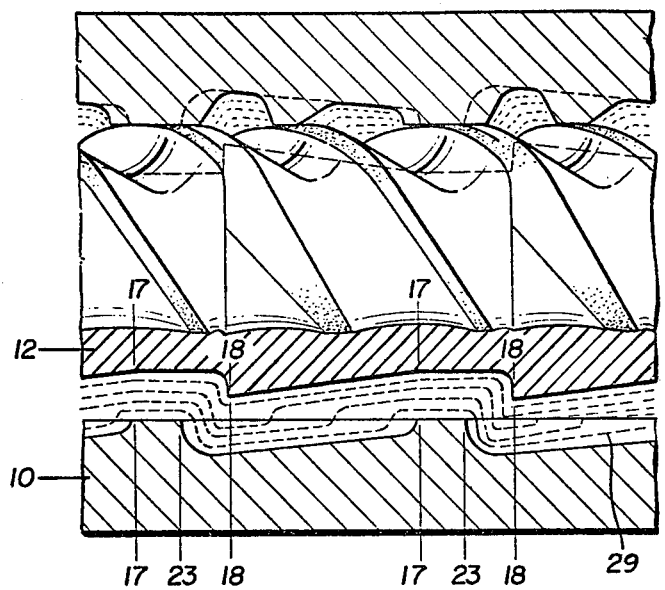
FIG. 23 is a sectional view of the stock mixing stage, which incorporates means for longitudinally displacing the rotor member relative to the barrel member, with the bottom cut-away representing stock flow with the rotor in a minimum restrictive position.

FIG. 23 is a sectional view of the assembled mixing stage, showing the normal relation between rotor member 12 and barrel member 10 with the bottom cut-away section indicating normal stock flow which is shown by six dashed lines 29. It can be observed that the combined grooves of rotor member 12 and barrel member 10 provide an adequate channel through the extruder apparatus A. Points 17 and 18 of the rotor member 12 align with points 17 and 18 of the groove of the barrel member 10.

Figure 24:
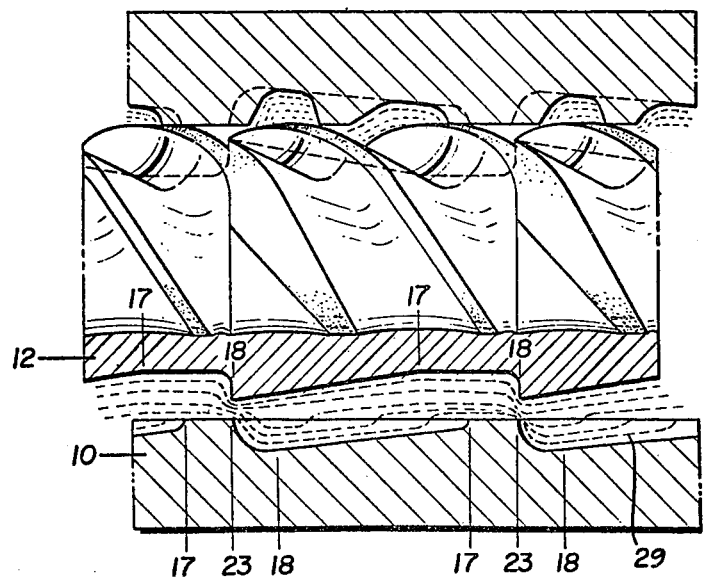
FIG. 24 is a sectional view of the stock mixing stage with the rotor member shifted forward to a restrictive position and with the bottom cut-away representing stock flow and depicting high flow rate location to decrease extrusion capacity.

FIG. 24 is a similar sectional view of the assembled mixing stage, but with the normal relation between rotor member 12 and barrel member 10 displaced longitudinally. Point 18 of the rotor member 12 now aligns with point 23 of the barrel member 10. An examination of six dashed lines 29, shown in the cut-away section at the bottom of FIG. 24, now indicate a flow concentration at point 18 of the rotor member 12 or point 23 of the barrel member 10. This flow concentration is the means of restricting flow and, thereby, reducing extruder capacity or throughput.

Returning to FIG. 1, the means for longitudinal or lengthwise adjustment of the rotor member 12 is comprised of the following: threaded nut 30 is secured to the drive spindle 31. Adjusting screw 32 is threaded into nut 30 and brought to bear on the rotor extension 33, when rotor 12 is to be moved forward. For retracting the rotor member 12, the adjusting screw 32 is brought to bear against rotor extension stop nut 34. Adjusting screw 32 is driven by spur gear 35, which is in turn driven by worm gear 36 and associated drive motor. Worm gear is engaged and disengaged via hinge 37 and air cylinder 38. This drive method allows longitudinal drive of the rotor 12, when drive means is at rest. A more elaborate adjustment means would utilize a differential drive, not shown, which would allow adjustments to be made during extruder operation.

The entire extruder apparatus A is mounted, by suitable bolts or machine screws, not shown, on the base 42 which, in turn, may be affixed by suitable studs, not shown, to the floor 44.

FIG. 25 is a fragmentary elevational view of a rotor member 12' like rotor member 12 but of modified groove design wherein the rotor grooves 19' are reduced to zero extrusion capacity so that the maximum of stock being processed is transferred to the barrel grooves in the rotor to barrel zone. In the rotor depicted in FIG. 25 the grooves 19' are at a helix angle of about 60° to the axis of the rotor. Other suitable helix angles may be employed. The rotor grooves are also double in number at the barrel to rotor zone 18 to 23. This is accomplished by means of a stock divider 40 in each groove 19' at the start thereof. Blending considerations could be served by dividing only half of the grooves.

FIG. 26 is a surface development of one quadrant of the helical groove 19' of the rotor 12' showing the relation of the groove 19' and land areas 21' of rotor member 12'.

FIGS. 27–32 inclusive illustrate progressive transverse sections of quadrant of the rotor member 12' showing approximate shape of the groove 19' to achieve extrusion capacity.

FIG. 33 is a fragmentary sectional view on the lines 33—33 of FIG. 26.

FIG. 34 is a sectional view of a barrel member 10' similar to the barrel member 10 showing six start helical barrel grooves 20' of modified design and land areas 22' from point 23 of the first mixing stage to point 23' of the second mixing stage.

FIG. 35 is a surface development of one helical sextant of the bore 11' or barrel member 10' showing the relation of groove 20' to land areas 22'. FIG. 35 displays the change of lead between points 17 and 18, compared with lead between points 18 and 23'.

FIGS. 36–40 inclusive illustrate progressive transverse sections of sextant of the barrel member showing approximate shape of barrel grooves 20' for stock retention and transmission. The design depicted in FIGS. 34–40 directs the flow pattern circumferentially so as to obtain longitudinal groove shearing of the stock as it passes from barrel to rotor. The helix angle of the groove 20' is preferably from about 45° to 60° with the center line of the bore 11'. Stock flow at trailing edge of groove assists in slowing down the circumferential flow of stock and changing its direction to cross groove flow. The cam shaped circumferential groove propels the stock from the barrel toward the rotor, with adequate volumne to develop extrusion pressure. Stock flow is circumferential and has predominance of shear lines axially with the rotor or at an acute angle to the direction of the groove. The circumferential shear, as the stock passes from barrel to rotor, now tends to elongate the shear lines into areas. This type of shearing is desirable to obtain microscopic dispersion, but is less effective for stock blending than the cross grove shearing. Entrance to the circumferential groove can be fitted with a stock divider.

FIG. 41 is a sectional view of another or alternate form of barrel groove 20" of barrel member 10". There are four start helical grooves 20" with land areas 22' in this alternate barrel member 10".

FIG. 42 is a surface development of one helical quadrant of the bore 11" of barrel member 10" showing the relation of groove 20" to land areas 22".

FIGS. 43–47 inclusive illustrate progressive transverse sections of the barrel member 10" showing approximate shape of barrel grooves 20" for stock retention and transmission.

FIGS. 48 and 49 illustrates sections of the barrel grooves 20" on the lines 48—48 and 49—49, respectively.

FIGS. 41, 42 display a change of lead between points 17 and 18, to zero lead between points 18 and 23'. The helix angle of the groove 20" in the rotor to barrel zone is preferably from 45° to 60° with the centerline of the bore 11" and changes to zero in the barrel to rotor zone 18 to 23', that is, parallel with the centerline of the bore 11'.

Stock in an extruder groove tends to flow in the following pattern. The exposed portion of the stock in the groove is subjected to circumferential actuation or shear so that the resulting flow, toward the trailing edge of the groove, is essentially circumferential. The stock, displaced by this circumferential flow; then follows the path of least resistance, back to the leading edge of the extruder groove. This return path tends to be at right angles to the groove, but pressure flow, can result in a path that is nearly parallel to the axis of the rotor.

The design of FIGS. 41, 42 directs this flow pattern radially, so as to obtain cross groove shearing of the stock as it passes from barrel to rotor.

Stock flow at trailing edge of groove assists in slowing down the circumferential flow and changing its direction to cross groove flow. Restricted flow area increases flow velocity so that the resulting flow direction is nearly axial. The barrel to rotor groove is axial in direction and circular in profile so that the stock is turned at right angles and leaves the barrel in a radial direction. The stock divider 42, located at the center of the axial discharge groove, stabilizes the radial flow of stock from the barrel groove. Large land areas of this design are effective in actuating flow in the corresponding rotor grooves. This design (cross shearing) is effective because the stock in the barrel groove, due to the design of the rotor to barrel stock flow, is in the form of a long spiral, of wound sheet stock, the width of which, is the length of the rotor to barrel zone and the pitch or lead is a function of capacity.

From the foregoing, it is believed that the apparatus for practicing this invention will be readily comprehended by persons skilled in the art. It is to be clearly understood, however, that various changes in the apparatus herewith shown and described, outlined above, may be resorted to without departing from the spirit of the invention as defined by the appended claims. While the foregoing apparatus has been described primarily in connection with the refining of materials such as cured or rubber stocks, it is particularly to be understood that this apparatus, with or without minor changes and adjustments, may readily be employed in processing other thermo-plastic and thermo-setting materials both hot and cold feed.

What is claimed is:

1. An apparatus for the extruding and mixing of thermo-plastic and thermo-setting materials for both hot and cold feed which comprises: an elongated generally cylindrical barrel member and an elongated rotor member disposed coaxially in the interior of said barrel member; means provided for relative rotational movement between said rotor and barrel members in the treating and axial advancing of the material to be processed along said members; said rotor and barrel members having a feed end, a discharge end, and a mixing stage including a rotor to barrel zone and a barrel to rotor zone interposed between said feed and discharge ends; the portions of said rotor and barrel members in said zones each being provided with one or more longitudinal helical grooves; the grooves of said rotor and barrel members in said rotor to barrel zone being sized, with the extrusion capacity of the helical groove in said rotor member decreasing uniformly along the length of said rotor to barrel zone with maximum extrusion capacity at the beginning of said rotor to barrel zone and minimum extrusion capacity of helical groove in said barrel member increasing uniformly along the length of said rotor to barrel zone with minimum extrusion capacity at the beginning of said rotor to barrel zone and maximum extrusion capacity at the end of said rotor to barrel zone, whereby said relative rotational movement between said rotor and barrel members causes materials to flow outward from the groove in said portion of the rotor member in said rotor to barrel zone along the length of said rotor to barrel zone into the groove of the portion of said barrel member in said rotor to barrel zone which receives the material; said grooves in the portion of said barrel member in said barrel to rotor zone having reduced change in depth to turn the material presented away from the groove provided in said barrel member and to direct the reoriented material towards the groove provided in said rotor member for changing the axis of material shear as said material is advanced from said barrel member to said rotor member in said barrel to rotor zone from where the material flows to said discharge end upon relative rotational movement between said members.

2. An apparatus as claimed in claim 1 in which at least the downstream end of said groove in said barrel member in said barrel to rotor zone has a flow divider therein.

3. An apparatus as claimed in claim 1 in which said groove in said barrel member has a baffle therein in said barrel to rotor zone.

4. An apparatus as claimed in claim 1 in which said groove in said barrel member has a baffle in the open side thereof in said barrel to rotor zone.

5. An apparatus as claimed in claim 1 in which the helix angle of at least the downstream end of said groove in said barrel member in said barrel to rotor zones is different than the helix angle of said groove in said barrel in said rotor to barrel zone.

6. An apparatus as claimed in claim 1 and means for longitudinally displacing one of said members relative to said other member to vary the extrusion capacity of said rotor and barrel members.

7. An apparatus as claimed in claim 6 in which at least the downstream end of said groove in said barrel member in said barrel to rotor zone has a flow divider therein.

8. An apparatus as claimed in claim 6 in which said groove in said barrel member has a baffle in the open side thereof in said barrel to rotor zone.

9. An apparatus as claimed in claim 6 in which the helix angle of at least the downstream end of said groove in said barrel member in said barrel to rotor zone is different than the said helix angle of said groove in said rotor to barrel zone.

10. An apparatus as claimed in claim 1 wherein said barrel to rotor zone has a length less than the length of said screw to barrel zone.

11. An apparatus as claimed in claim 1 wherein the groove of said barrel member in said zones has a single lead.

12. An apparatus as claimed in claim 1 wherein the grooves of said barrel member in said zones have multiple leads effective to turn the stock in a circumferential direction for stock reorientation.

13. An apparatus as claimed in claim 1 wherein the groove of the barrel member in said rotor to barrel zone has a lead sufficient for full capacity extrusion, and wherein the groove of the barrel member in said barrel to rotor zone has a lead approximating zero.

14. An apparatus as claimed in claim 1 wherein there are a plurality of mixing stages in said rotor and barrel members, each of said stages including a rotor to barrel zone and a barrel to rotor zone.

15. An apparatus as claimed in claim 1 in which the helix angles of said grooves in said rotor and barrel members are from about 45° to 78° with the centerline of the rotor member.

16. An apparatus as claimed in claim 1 wherein the groove of the barrel member in said rotor to barrel zone has a center line arranged at a maximum lead adequate for full capacity extrusion, and wherein the groove of the barrel member in said barrel to rotor zone has a center line arranged at a minimum lead approximating zero.

17. An apparatus for the extruding and mixing of thermo-plastic and thermo-setting materials for both hot and cold feed which comprises; an elongated generally cylindrical barrel member and an elongated rotor member disposed coaxially in the interior of said barrel member; means providing for relative rotational movement between said rotor and barrel members in the treating and axial advancing of the material to be processed along said members; said rotor and barrel members having a feed end, a discharge end, and a mixing stage including a rotor to barrel zone and a barrel to rotor zone interposed between said feed and discharge ends; the portions of said rotor and barrel members in said zones each being provided with one or more longitudinal helical grooves the helix angles of which with respect to the axis of the rotor are from about 45° to 78°; the grooves of said rotor and barrel members in said rotor to barrel zone being sized, with the extrusion capacity of the helical groove in said rotor member decreasing uniformly along the length of said rotor to barrel zone with maximum extrusion capacity at the beginning of said rotor to barrel zone and minimum extrusion capacity at the end of said rotor to barrel zone, and with the extrusion capacity of helical groove in said barrel member increasing uniformly along the length of said rotor to barrel zone with minimum extrusion capacity at the beginning of said rotor to barrel zone and maximum extrusion capacity at the end of said rotor to barrel zone, whereby said relative movement between said rotor and barrel members causes materials to flow outward from the groove in said portion of the rotor member in said rotor to barrel zone along the length of said rotor to barrel zone into the groove of the portion of said barrel member in said rotor to barrel zone which receives the material; said groove in the portion of said barrel member in said rotor to barrel zone having a reduced change in depth and interrupting the flow of the axially advancing material along the groove provided in the portion of said barrel member in said barrel to rotor zone and being effective to turn the material presented as near to right angles as possible away from the groove provided in said barrel members and to direct the reoriented material towards the groove provided in said rotor-member from where the material flows to said discharge end upon relative rotational movement between said members; the said helical groove of said barrel member of said rotor to barrel zone entering said barrel to rotor zone and forming a discharge groove with the lead thereof, which is the axial advancement per turn, being reduced to essentially zero and the depth thereof varying from maximum depth to zero at the trailing end rotationally, the change in lead presenting the material being transferred from the barrel to rotor in the barrel to rotor zone with shear lines reoriented from the preceding zone resulting in cross shearing of material when entering the rotor member.

18. An apparatus for the extruding and mixing of thermo-plastic and thermo-setting materials for both hot and cold feed which comprises; an elongated generally cylindrical barrel member and an elongated rotor member disposed coaxially in the interior of said barrel member; means providing for relative rotational movement between said rotor and barrel members in the treat and axial advancing of the material to be processed along said members; said rotor and barrel members having a feed end, a discharge end, and a mixing stage including a rotor to barrel zone and a barrel to rotor zone interposed between said feed and discharge ends; the portions of said rotor and barrel members in said zones each being provided with one or more longitudinal helical grooves the helix angles of which with respect to the axis of the rotor are from about 45° to 78°; the grooves of said rotor and barrel members in said rotor to barrel zone being sized, with the extrusion capacity of the helical groove in said rotor member decreasing uniformly along the length of said rotor to barrel zone with maximum extrusion capacity at the beginning of said rotor to barrel zone and minimum extrusion capacity at the end of said rotor to barrel zone, and with the extrusion capacity of helical groove in said barrel member increasing uniformly along the length of said rotor to barrel zone with minimum extrusion capacity at the beginning of said rotor to barrel zone and maximum extrusion capacity at the end of said rotor to barrel zone, whereby said relative rotational movement between said rotor and barrel members causes materials to flow outward from the groove in said portion of the rotor member in said rotor to barrel zone along the length of said rotor to barrel zone into the groove of the portion of said barrel member in said rotor to barrel zone which receives the material; said groove in the portion of said barrel member in said barrel to rotor zone having a reduced change in depth and interrupting the flow of the axially advancing material along the groove provided in the portion of said barrel member in said barrel to rotor zone and being effective to turn the material presented as near to right angles as possible away from the groove provided in said barrel members and to direct the reoriented material towards the groove provided in said rotor member from where the material flows to said discharge end upon relative rotational movement between said members; the said helical groove of said barrel member of said rotor to barrel zone entering said barrel to rotor zone and forming a discharge groove with the lead thereof, which is the axial advancement per turn, being increased to essentially 90° and the depth thereof varying from maximum depth to zero at the trailing end rotationally, the change in lead presenting the material being transferred from the barrel to rotor in the barrel to rotor zone with shear lines reoriented from the preceding zone resulting in cross shearing of material when entering the rotor member.

19. An apparatus for the extruding and mixing of thermo-plastic and thermo-setting materials for both hot and cold feed which comprises; an elongated barrel member and an elongated rotor member disposed coaxially in the interior of said barrel member; means providing for relative rotational movement between said rotor and barrel members in the treating and axial advancing of the material to be processed along said members; said rotor and barrel members having a feed end, a discharge end, and a mixing stage including a rotor to barrel zone and a barrel to rotor zone interposed between said feed and discharge ends; the portions of said rotor and barrel members in said zones each being provided with one or more longitudinal helical grooves; the grooves of said rotor and barrel members in said rotor to barrel zone being sized, with the extrusion capacity of the helical groove in said rotor member decreasing uniformly along the length of said rotor to barrel zone, with maximum extrusion capacity at the beginning of said rotor to barrel zone, and minimum extrusion capacity of the helical groove of said barrel member increasing along the length of said rotor to barrel zone, with minimum extrusion capacity at the beginning of said rotor to barrel zone and maximum extrusion capacity at the end of said rotor to barrel zone; whereby said relative rotational movement between said rotor and barrel members causing the materials to flow longitudinally along the grooves of said rotor and barrel members in a downstream direction and also outward from said rotor grooves to said barrel grooves, along the length of said rotor to barrel zone, the extrusion capacity of the grooves of said rotor member causing the outward flow of material to be uniform along the length of said rotor to barrel zone; material reorienting means provided in the portion of said barrel member in said barrel to rotor zone, said material reorienting means interrupting the flow of the axially advancing material along the groove provided in the portion of said barrel member in said barrel to rotor zone and being effective to turn the material presented away from the groove provided therein and to direct the reoriented material towards the groove provided in said rotor member from where the material flows to said discharge end upon relative rotational movement between said members.

20. An apparatus as claimed in claim 19 in which said groove in said barrel member has a baffle therein in said groove in said barrel to rotor zone.

21. An apparatus as claimed in claim 20 wherein said baffle is a ring baffle which is effective at the inner portion of the groove in said barrel member to cause the pressure flow of the material to turn in a radial direction and flow out of the groove, said ring baffle restricting the flow of the material at the outer portions of the groove.

22. An apparatus as claimed in claim 21 wherein the depth of the groove adjacent said ring baffle in said barrel member is of diminished depth when compared to the depth of the remaining portion of the groove in said barrel member in said barrel to screw zone.

23. An apparatus as claimed in claim 19 and means for longitudinally displacing one of said members relative to said other member to vary the extrusion capacity of said screw and barrel members.

24. An apparatus as claimed in claim 19 wherein said barrel to screw zone has a length less than the length of said screw to barrel zone.

25. An apparatus as claimed in claim 19 wherein the groove of said barrel member in said zones has a single lead.

26. An apparatus as claimed in claim 19 wherein the grooves of said barrel member in said zones have multiple leads effective to turn the stock in a circumferential direction for stock reorientation.

27. An apparatus as claimed in claim 19 wherein said barrel to rotor zone is followed by an extruder zone adjacent said discharge end, said extruder zone including a generally smooth cylindrical barrel portion and a generally helical rotor portion on said screw member.

28. An apparatus as claimed in claim 19 wherein said zones include four start grooves on said rotor member and four or more start grooves in said barrel member, said start grooves being of similar or varying extrusion capacity.

29. An apparatus as claimed in claim 19 wherein there are a plurality of mixing stages in said rotor and barrel members, each of said stages including a rotor to barrel zone and a barrel to rotor zone.

30. An apparatus for the extruding and mixing of thermo-plastic and thermo-setting materials for both hot and cold feed which comprises; an elongated barrel member and an elongated rotor member disposed coaxially in the interior of said barrel member; means providing for relative rotational movement between said rotor and barrel members in the treating and axial advancing of the material to be processed along said members; said rotor and barrel members having a feed end, a discharge end, and a mixing stage including a rotor to barrel zone and a barrel to rotor zone interposed between said feed and discharge ends; the portions of said rotor and barrel members in said zones each being provided with one or more longitudinal helical grooves; the grooves of said rotor and barrel members in said rotor to barrel zone being sized, with the extrusion capacity of the helical groove in said rotor member decreasing uniformly along the length of said rotor to barrel zone, with maximum extrusion capacity at the beginning of said rotor to barrel zone, and minimum extrusion capacity at the end of said rotor to barrel zone, and with the extrusion capacity of the helical groove of said barrel member increasing along the length of said rotor to barrel zone, with minimum extrusion capacity at the beginning of said rotor to barrel zone and maximum extrusion capacity at the end of said rotor to barrel zone, said rotor to barrel zone having zone extrusion capacity for material not transmitted by the grooves of said screw members to the grooves of said barrel member; whereby said relative rotational movement between said rotor and barrel members causing the materials to flow longitudinally along the grooves of said rotor and barrel members in a downstream direction and also causing a major portion of the materials to flow outward from said rotor grooves to said barrel grooves, along the length of said rotor to barrel zone, the extrusion capacity of the grooves of said rotor member causing the outward flow of material to be uniform along the length of said rotor to barrel zone, the minor portion of the materials not transferred to said barrel member by said rotor member being transmitted by said rotor member, along the length of said rotor to barrel zone, to the rotor member of said barrel to screw zone; material reorienting means provided in the portion of said barrel member in said barrel to rotor zone, said material reorienting means interrupting the flow of the axially advancing material along the groove provided in the portion of said barrel member in said barrel to rotor zone and being effective to turn the material presented away from the groove provided therein and to direct the reoriented material towards the groove provided in said rotor member where the reoriented material is mixed with the axially advancing material in the rotor member in said barrel to rotor zone from where the material flows to said discharge end upon relative rotational movement between said members.

31. An apparatus for the extruding and mixing of thermoplastic and thermo-setting materials for both hot and cold feed which comprises: an elongated barrel member and an elongated rotor member disposed coaxially in the interior of said barrel member; means providing for relative rotational movement between said rotor and barrel members in the treating and axial advancing of the material to be processed along said members; said rotor and barrel members having a feed end, a discharge end, and a mixing stage including a rotor to barrel zone and a barrel to rotor zone interposed between said feed and discharge ends; the portions of said rotor and barrel members in said zones each being provided with one or more longitudinal helical grooves; the grooves of said rotor and barrel members in said rotor to barrel zone being sized, with the extrusion capacity of the helical groove in said rotor member decreasing uniformly along the length of said rotor to barrel zone, with maximum extrusion capacity at the beginning of said rotor to barrel zone, and minimum extrusion capacity at the end of said rotor to barrel zone, and with the extrusion capacity of the helical groove of said barrel member increasing along the length of said rotor to barrel zone, with minimum extrusion capacity at the beginning of said rotor to barrel zone and maximum extrusion capacity at the end of said rotor to barrel zone, said relative rotational movement between said rotor and barrel members causing the materials do flow longitudinally along the grooves of said rotor and barrel members in a downstream direction and also causing materials to flow outward from said rotor grooves to said barrel grooves, along the length of said rotor to barrel zone, the extrusion capacity of the grooves of said rotor member causing the outward flow of material to be uniform along the length of said rotor to barrel zone, material reorienting means provided in the portion of said barrel member in said barrel to rotor zone, said material reorienting means interrupting the flow of the axially advancing material along the groove provided in the portion of said barrel member in said barrel to rotor zone and being effective to turn the material presented away from the groove provided therein and to direct the reoriented material towards the groove provided in said member from where the material flows to said discharge end upon relative rotational movement between said members; the said helical groove of said barrel member of said rotor to barrel zone entering said barrel to rotor zone and forming a discharge groove with the lead thereof, which is the axial advancement per turn, being reduced to essentially zero and the depth thereof varying from maximum depth to zero at the trailing end rotationally, the change in lead presenting the material being transferred from the barrel to rotor in the barrel to rotor zone with shear lines reoriented from the preceding zone resulting in cross shearing of material when entering the rotor member.

32. An apparatus for the extruding and mixing of thermo-plastic and thermo-setting materials for both hot and cold feed which comprises; an elongated cylindrical barrel member and an elongated cylindrical rotor member disposed coaxially in the interior of said cylindrical barrel member; means providing for relative rotational movement between said rotor and barrel members in the treating and axial advancing of the material to be processed along said members; said rotor and barrel members having a feed end, a discharge end, and a mixing stage including a rotor to barrel zone and a barrel to rotor zone interposed between said feed and discharge ends; the portions of said cylindrical rotor and barrel members in said zones each being provided with one or more longitudinal helical grooves; the grooves of said screw and barrel members in said rotor to barrel zone being sized, with the extrusion capacity of the helical groove in said rotor member decreasing uniformly along the length of said rotor to barrel zone, with maximum extrusion capacity at the end of said rotor to barrel zone, and with the extrusion capacity of the helical groove in said barrel member providing the extrusion capacity for the material not transmitted by the rotor, increasing along the length of said rotor to barrel zone, with minimum extrusion capacity at the beginning of said rotor to barrel zone and maximum extrusion capacity at the end of said rotor to barrel zone, whereby said relative rotational movement between said rotor and barrel members causes materials to flow longtudinally along the grooves of said screw and barrel members in a downstream direction and also causing a major portion of the materials to flow outward from said screw grooves to said barrel grooves, along the length of said screw to barrel zone, the extrusion capacity of the grooves of said screw member causing the outward flow of material to be uniform along the length of said screw to barrel zone, the minor portion of the materials not transferred to said barrel member by said screw member being transmitted by said screw member, along the length of said screw to barrel zone, to the screw member of said barrel to screw zone; said groove in the portion of said barrel member in said barrel to rotor zone having a reduced change in depth and interrupting the flow of the axially advancing material along the groove provided in the portion of said barrel member in said barrel to rotor zone and being effective to turn the material presented as near to right angles as possible away from the groove provided in said barrel members and to direct the reoriented material towards the groove provided in said rotor member where the reoriented material is mixed with the axially advancing material in the rotor member in said barrel to rotor zone from where the material flows to said discharge end upon relative rotational movement between said members; the said helical groove of said barrel member of said rotor to barrel zone entering said barrel to rotor zone and forming a discharge groove with the lead thereof which is the axial advancement per turn, being reduced to essentially zero and the depth thereof varying from maximum depth to zero at the trailing end rotationally, the change in lead presenting the material being transferred from the barrel to rotor in the barrel to rotor zone with shear lines reoriented from the preceding zone resulting in cross shearing of material when entering the rotor member.

* * * * *